United States Patent [19]
Hosoe et al.

[11] 3,937,950
[45] Feb. 10, 1976

[54] FOCUS DEFECTING SYSTEM

[75] Inventors: Kazuya Hosoe, Tokyo; Seiichi Matsumoto, Yokohama; Hideo Yokota; Hiroshi Aizawa, both of Tokyo, all of Japan

[73] Assignee: Canon Kabushiki Kaisha, Japan

[22] Filed: Apr. 8, 1974

[21] Appl. No.: 459,219

[30] Foreign Application Priority Data
Apr. 11, 1973 Japan.................................. 48-41000

[52] U.S. Cl. ................... 250/201; 356/123; 354/25; 250/211 R; 250/211 K
[51] Int. Cl.² ........................................... G01J 1/20
[58] Field of Search ............ 250/211 R, 211 K, 212, 250/210, 201; 354/25, 31; 356/123

[56] References Cited
UNITED STATES PATENTS

| | | | |
|---|---|---|---|
| 2,879,405 | 3/1959 | Pankove........................... | 250/211 K |
| 3,193,686 | 7/1965 | Heinz............................ | 250/211 K X |
| 3,222,531 | 12/1965 | Morrison......................... | 250/211 K |
| 3,649,840 | 3/1972 | Thorn et al................. | 250/211 K X |
| 3,830,571 | 8/1974 | Imai et al............................ | 356/123 |

*Primary Examiner*—Walter Stolwein
*Attorney, Agent, or Firm*—Toren, McGeady and Stanger

[57] ABSTRACT

A system for detecting the distinction of the object image characterized in that respectively on a photoelectric transducing element presenting electrodes on both extremities along the longer sides of a photoelectric semiconductor presenting considerably short sides as compared with the long sides and on a photoelectric transducing element presenting electrodes on both extremities along the shorter sides of a photoelectric semiconductor presenting considerably short sides as compared with the long sides an object image is formed by means of an optics and that the distinction of the above mentioned object image is detected by detecting the electric characteristics variable corresponding to the distinction of the above mentioned object image, of each of the above mentioned photoelectric transducing elements.

16 Claims, 20 Drawing Figures

| γ VALUE | SERIES TYPE | PARALLEL TYPE |
|---|---|---|
| γ < 1 | MAXIMUM | MAXIMUM |
| γ = 1 | MAXIMUM | NO CHANGE |
| γ > 1 | MAXIMUM | MINIMUM |

FOCUS DEFECTING SYSTEM

The present invention relates to a system for detecting the image of the object for focus adjustment of the optics suited for photographic devices such as camera as well as to a system and a device for adjusting the focus of the optics such as camera utilizing the above mentioned detecting system. Until now various systems for detecting the destinction of the image of the object utilizing the non linear photoelectric effect especially taking place in the photoconductive materials such as CdS or CdSe have already known for example for the Japanese patent publications Sho 39-29120, Sho 41-14500 and Sho 44-9501. Hereby the above mentioned non linear photoelectric effect of the photconductive material means the phenomenon that the electric characteristics of the above mentioned photoconductive materials, especially the value of resistance is increased or decreased according as the distinction of the object image formed on the photoconductive materials is raised, whereby this phenomenon arises from the fact that the quantity of the incident beam per unit area of the photoconductive material is varied according to the variation of the distinction of the object image in such a manner that when the distinction is maximum the distribution of the quantity of the incident beam on each point of the photoconductive materials becomes remarkably uneven.

In other words the differences between the quantity of the beam at the bright part and that at the dark part of the image of the object becomes largest when the distinction is highest in such a manner that the value of the resistance differs very much at the different parts of the photoconductive materials. However in case of the actual objects which are often photographed die distribution of the bright parts and of the dark parts is remarkably irregular, whereby it can not always be said that the difference between the brightness at the bright part and that at the dark part, namely the contrast is large so that it must be said that only by forming the object image on the surface of the photoelectric element consisting of the above mentioned photoconductive material a sufficient photoelectric effect cannot be obtained so that it is difficult to detect the distinction of the object image with high accuracy.

The object of the present invention is to offer a process and a device by means of which the focus of the optics such as camera can easily be detected by detecting the distinction of the object image with high accuracy so as to solve the above mentioned difficulties.

The present invention is characterized in that respectively on a photoelectric transducing element presenting electrodes on both extremities along the longer sides of a photoelectric semiconductor presenting considerably short sides as compared with the long side (hereby called parallel type element) and on a photoelectric transducing element presenting electrodes on both extremities along the shorter sides of a photoelectric semiconductor presenting considerably short sides as compared with the long sides (hereby called series type element) an object image is formed by means of an optics and that the producing a synergistic effect on the above mentioned photoelectric effects produced by the above mentioned photoelectric transducing elements the distinction of the object image is detected with extremely high accuracy, whereby the purpose of the present invention is to offer a system and a device for adjusting the focus of the optics such as camera utilizing the output of such a detecting system.

Below the present invention will be explained in detail according to the attached drawings.

Figure 1A:
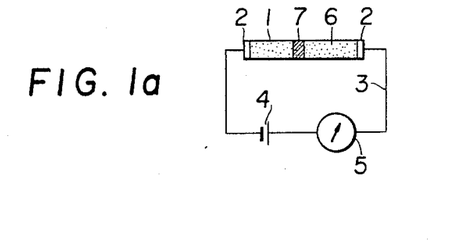
FIGS. 1A-1D shows diagrammatical drawings for the explanation of the effect of the series type element and of the parallel type element.

In FIGS. 1(a) and (b) a photoelectric transducing element namely a series type element presenting two electrodes on both extremities along the shorter sides of a photoelectric semi-conductor 1 presenting considerably short sides as compared with the long sides is connected with the current source 4 by means of a lead wire 3. 5 is a galvanometer for measuring the photoelectric current. Further in FIGS. 1(c) and (d) a photoelectric transducing element namely a parallel type element presenting two electrodes on both extremities along the longer sides of a photoelectric semi-conductor 1 presenting considerably short sides as compared with the long sides is connected with the current source 4 by means of a lead wire 3. Further in FIG. 1(a) the image of an object presenting a dark portion 7 in the center of the bright portion 6 is formed, while in FIG. 1(b) the image of an object presenting a bright portion 9 in the center of the dark portion 8 is formed. In FIGS. 1(c) and (d) the image of an object presenting a bright and a dark portion is similarly formed.

In case of FIG. 1(a) it is clear that the clearer the image of the object becomes the less photoelectric current flows because the brightness of the dark portion is extremely lowered. The less clear the image of the object becomes the more photoelectric current flows because the difference between the brightness of the bright portion 6 and that of the dark portion 7 becomes smaller.

Figure 1B:
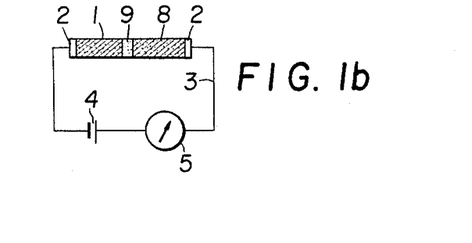
Figure 1C:
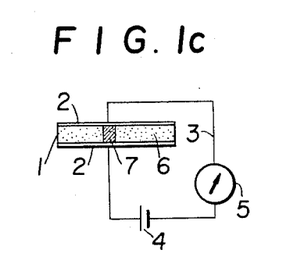

The clearer the image of the object in case of FIG. 1(b) becomes, the less photoelectric current flows until no current flows because the brightness of the dark portion 8 is lowered. Although however in this case the image of the object becomes less clear, the area of the dark portion 8 is considerably large as compared with that of the bright portion 9 so that it is considered that the brightness in the neighborhood of the electrodes 2 should remain considerably low and the photoelectric current should practically be not increased. Namely it is considered that in case of a photoelectric transducing element namely a series element as shown in FIGS. 1(a) and (b) the photoelectric current is almost decided by the dark portion of the image of the object, namely it can be concluded that the series type element is very sensitive to the dark portion of the image of the object.

Figure 1D:
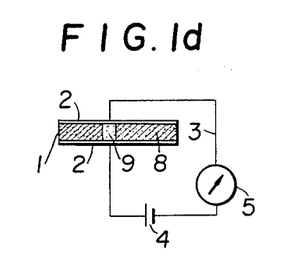

Although the image of the object in case of FIG. 1(c) becomes clearer or less clearer, the internal resistance of the photoelectric semi-conductor between the electrodes 2 does not make any practical change because the area of the bright part 6 is considerably large as compared with that of the dark portion 7, so that the variation of the photoelectric current is small. In case of FIG. 1(c) on the other hand a photoelectric current flows through the part of the photoelectric semi-conductor corresponding to the bright portion 9, so that it is clear that the intensity of the photoelectric current depends upon the brightness of the bright portion 9. Namely the photoelectric current make a considerably large variation depending upon the bright portion so that it can be concluded that the parallel type element is very sensitive to the bright portion.

Although the image of the object in case of FIG. 1(c) becomes clearer or less clear the internal resistance of the photoelectric semiconductor between the electrodes 2 does not make any practical change because the area of the bright portion 6 is considerably large as compared with that of the dark portion 7 so that the variation of the photoelectric current is small. In case of FIG. 1(d) on the other hand a photoelectric current flows through the part of the photoelectric semiconductor corresponding to the bright portion 9, whereby it is clear that the intensity of the photoelectric current varies depending upon the brightness of the bright portion 9. Namely the photoelectric current makes a considerably large variation depending upon the bright portion, whereby it can be concluded that the parallel type element is sensitive to the bright portion. In the conventional system for detecting the distinction of the object image making use of the photoelectric effect of semiconductor it seems that it is mostly proposed to use a photoelectric element presenting an electrode structure called comb type, which element corresponds with the parallel type element, whereby as is clear from the above explanation it is impossible to obtain a sufficient sensitivity for detecting the distinction of the object which present dark lines in the bright portion. The present invention is characterized in that a parallel type element and a series type element are used as mentioned above in common in order to be able to detect the distinction of the object always with high accuracy regardless of the distributed state of the bright and the dark portion of the object.

FIG. 2 shows practical dispositons of the light reveiving element consisting of series type elements and parallel type elements as shown diagrammatically in FIG. 1 so as to be applicable for the present invention. FIG. 2(a) and (b) respectively show the disposition of the series type element and that of the parallel type element. In FIG. 2(a) 10 is a base plate consisiting of a non-conductive body, on which a photoelectric semi-conductor is disposed by vaporization. 12 is a separation wall of a non-conductive body for forming narrow-tape shaped structure of the photoelectric semiconductor, whereby in the present embodiment the photoelectric semiconductor shapes in form of narrow-tape by means of the separation wall is folded again and again along the semicircular arc up to the center of the circle so as to reach the other end through a similar process in such a manner that the photoelectric semiconductor presents conductive electrodes 13 at both extremities along the short sides together with the lead wires 14. It can easily be understood that the photoelectric element consisting of the above mentioned photoelectric semiconductor and the above mentioned electrode be of series type, whereby further it can be expected from the reason explained according to FIG. 1 that on certain determined portion of the photoelectric semiconductor the distinction should be detected regardless of the distributed state of the image of any object, when the image is formed on the element, by the fact that the photoelectric semiconductor is formed in concentrical arcs.

Figure 2A:
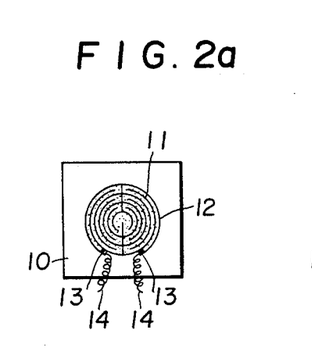
FIGS. 2A-2D shows embodiments consisting of the series type element and of the parallel type element.
Figure 2B:
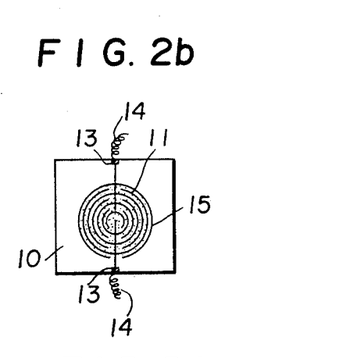

In FIG. 2(b) on a base plate 10 consisting of a non-conductive body a photoelectric semiconductor 11 is disposed by evaporation. 15 is a conductive part composing a narrow-tape shaped structure of the photoelectric semiconductor and serving electrode at the same time, whereby it is so designed as to present the same structure as that of the separation wall 12 of the series type element shown in FIG. 2(a). 14 are the lead wires connected to the extremities of the conductive part 15 by means of separate conductive bodies 13.

It is clear that the photoelectric element consisting of the photoelectric semiconductor and the electrodes as mentioned above is of parallel type element, whereby the photoelectric semiconductor is formed equally to the case of the series type element so as to be effective for detecting the distinction of the image of any object.

Figure 2C:
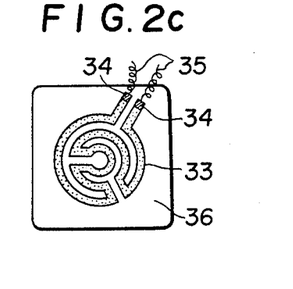
Figure 2D:
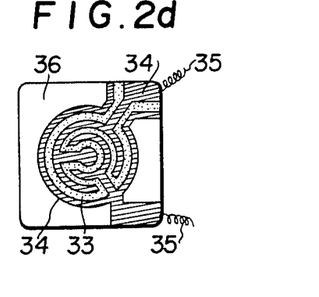

FIGS. 2(c) and (d) respectively show further another embodiment according to the present invention, of the series type element and the parallel type element as mentioned above. FIG. 2(c) shows a disposition of a series type element, in which the electrodes 34 and the lead wires 35 are provided at both extremities along the direction of the short sides of the photoelectric semiconductor 33 presenting a form of folded arc, whereby the element is disposed on a base plate 36 consisting of non-conductive body. In FIG. 2(d) shows the disposition of the parallel type element, in which the electrodes 34 and the lead wires 35 are formed on both extremities along the direction of the long sides of the photoelectric semiconductor 33 presenting a form similar to that of the series type element, whereby the element is disposed on a base plate 36 consisting of non-conductive body. The forms of the photoelectric semiconductors shown in FIG. 2 differ much from those shown in FIG. 1, while their principal dispositions are equal to each other, whereby in case of the dispositions shown in FIG. 2 the elements present a form of the folded arcs in order that the elements present a sufficient efficiency as mentioned according FIG. 1 even for such an image of the object in general as presents a complicated form presenting boundaries between the bright and the dark portion along the various directions, whereby it is natural that the form of the photoelectric semiconductor does not necessarily present the forms shown in FIG. 2.

It is already known that the relation between the brightness E on the photoelectric semiconductor and the value of the resistance are generally represented by the following formula:

$$R = KE^{-\gamma} \quad (1)$$

whereby K and $\gamma$ respectively are the constants proper to the kind of the photoelectric semiconductor, the composition and so on. The analytical explanation of the variation of the value of the resistance corresponding to the distinction of the image of an object due to the photoelectric effect will be made according to the above mentioned formula and the FIG. 3.

Figure 3A:
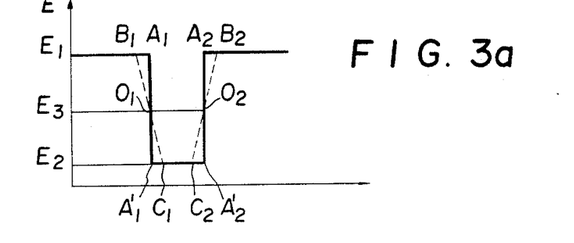
FIGS. 3A-3D is a table to show the variation of the resistance value when the distinction of the object image on the photoelectric element of each type becomes maximum.

FIG. 3(a) is a diagram of the distribution of the brightness of the object image in FIG. 1 on the photoelectric transducing element, whereby the ordinate represents the brightness while the abscissa represents the position on the photoelectric transducing element. Hereby an example presenting a bright portion in the dark portion is adopted in FIG. 3(a). As it is clear from the analysis to be mentioned below that the case when the bright portion exist in the dark portion gives the same result, the explanation for such case is omitted. Hereby as is already mentioned, the extent of the variation of the value of resistance differs according to the combination of the above mentioned distribution of the brightness of the object image, the series type element and the parallel type element. In FIG. 3 the solid line represents the distribution of the brightness when the distinction is maximum, while the broken line represents the distribution of the brightness when the distinction is maximum, while the broken line represents the distribution of the brightness when the distinction is lowered.

Figure 3B:
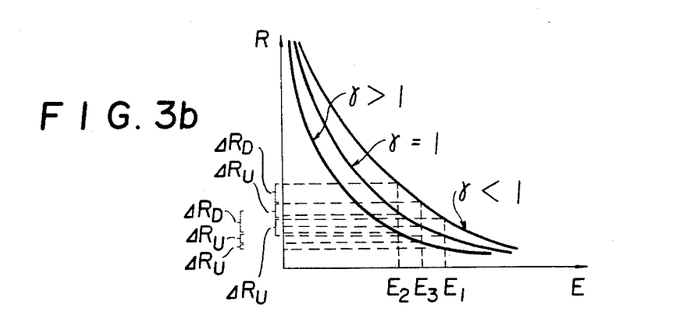
Figure 3C:
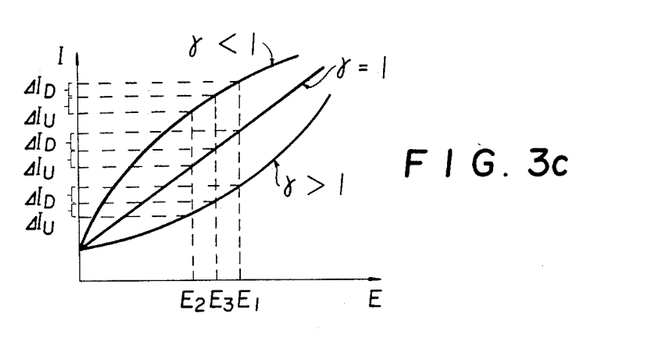

Let I be the photoelectric current when a certain determined voltage is given to the photoelectric semiconductor, so it is clear from the above mentioned formula that the following is satisfied $$I = K'E^\gamma \qquad (2)$$

whereby K' is a constant which is determined by the properties of the photoelectric semiconductor and the voltage given. The relations between R and E respectively I and E especially when $\gamma$ is greater than $1 (\gamma>1)$, $\gamma$ is equal to $1 (\gamma=1)$ and $\gamma$ is smaller than $1 (\gamma<1)$ are respectively shown in FIGS. 3(b) and (c). At first let us suppose that the distribution of the brightness in the neighborhood of the boundary between the bright and the dark portion shown by the solid line be changed into that shown by the broken line, namely let us suppose that the brightness at the part $A_1 B_1$ in the left neighborhood of the point $A_1$ and at the part $A_2 B_2$ in the right neighborhood of the point $A_2$ be lowered, while the brightness at the point $A_1' C_1$ in the right neighborhood of the point $A'$ and at the part $A_2' C_2$ in the left neighborhood of the point $A_2'$ is raised, whereby the brightness $E_3$ can be considered as the mean value of $E_1$ and $E_2$. From the relation between the variation of the brightness and the variation of the local resistance value in FIG. 3(b) it can be thought that the above mentioned decrease of the brightness nearly corresponds to the variation of the brightness from $E_1$ to $E_3$, while the increase of the brightness nearly corresponds to the variation of the brightness from $E_2$ to $E_3$, whereby the length at the part of $A_1 B_1$, $A_2 B_2$ and $A_1' C_1$, $A_2' C_2$ is very small. Consequently as is shown in FIG. 3(b) the increase of the resistance value accompanied by the decrease of the brightness is $\Delta R_U$, while the decrease of the resistance value accompanied by the increase of the brightness is $\Delta R_D$, when $\gamma$ is smaller than $1 (\gamma<1)$. On the other hand the second differentials of the formula (1) is $$\frac{d^2R}{dE^2} = K\gamma(\gamma+1)E^{-(\gamma+2)} > 0$$

Figure 3D:
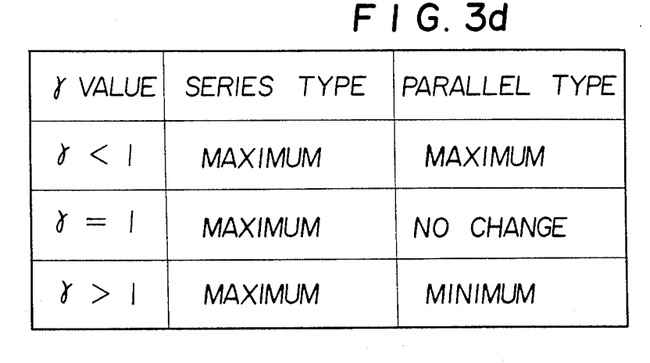

This means that the ratio of the variation of the resistance value R to the unit variation of the brightness becomes smaller according to the increase of the brightness E, and therefore $\Delta R_D$ becomes greater than $\Delta R_U$ ($\Delta R_D > \Delta R_U$). Thus the algebraic sum of the variation of the resistance value due to the local variation of the brightness becomes negative so that after all the total resistance value of the photoelectric semiconductor 1 is decreased while the photoelectric current is increased. It is clear that the same thing can be said of when $\gamma$ is equal to $1 (\gamma=1)$ and $\gamma$ is larger than $1 (\gamma>1)$. In other words it can be understood that in case of the series type element regardless of the value of $\gamma$ the value of the resistance becomes maximum (the value of the photoelectric current becomes minimum) when the distinction of the object image is maximum. Now let us consider the same thing for the parallel type element in FIG. 1(c). Hereby let us proceed the consideration adopting the relation between I and E in FIG. 3(c) in order to simplify the case. Let us represent in this case the decrease of the photoelectric current accompanied by the decrease of the brightness at the part $A_1 B_1$ and the part $A_2 B_2$ in $\Delta I_D$ and the increase of the photoelectric current accompanied by the increase of the brightness at the part $A_1' C_1$ and the part $A_2' C_2$ in $\Delta I_U$, so from the formula (2)

$$\frac{d^2I}{dE^2} = K'\gamma(\gamma-1)E^{\gamma-2}$$

so that according as $\gamma < 1$
$\gamma = 1$
$\gamma > 0$ , respectively
$d^2I/dE^2 < 0$
$d^2I/dE^2 = 0$
$d^2I/dE^2 > 0$ Thus in case $\gamma<1$, $\Delta I_U > \Delta I_D$, in case $\gamma = 1$, $\Delta I_D = \Delta I_U$ and in case $\gamma>1$, $\Delta I_U < \Delta I_D$, when as mentioned to the series type element the dependency of the ratio of the variation of the value of the photoelectric current I to the unit variation of the brightness E on the brightness E is judged from the sign of $d^2I/dE^2$. Thus it can be understood that photoelectric current flowing through the total photoelectric semiconductor becomes minimum (the value of the resistance becomes maximum) in case $\gamma<1$, that the photoelectric current becomes constant (the value of the resistance becomes constant) regardless of the distinction of the object image in case $\gamma = 1$ and that the photoelectric current becomes maximum (the value of the resistance becomes minimum) when the distinction of the object image is maximum in case $\gamma>1$. From the above it becomes clear that the series type element and the parallel type element for which $\gamma>1$ have reversed characteristics to each other for the variation of the electric characteristics for the distinction of the object image although both of them have non-linear photoelectric effect of the photoelectric semiconductor. The above result is shown in FIG. 3(d).

The purpose of the present invention is, as mentioned above, to utilize both of the series type element and the parallel type element so as to respond to the distinction of the image of any object as well as to obtain a considerably increased detectability of the distinction by means of the synergistic effect of the variation of the resistance value of the series type element and of the parallel type element. In case both the series type element and the parallel type element for both of which $\gamma>1$ are utilized and the image of the object is formed, the difference between the resistance values of both photoelectric element becomes considerably large when the distinction of the object is maximum because the resistance of the series type element becomes large while that of the parallel type element becomes small, so that the detectability for the distinction by means of both photoelectric elements is considerably large as compared with the case with only one type of the element.

Thus by properly combining various types of the elements various disposition of the system for detecting the object image suited to the present invention can be realized. Below the present invention will be explained in detail according to FIG. 4 of the embodiments of the present invention.

In FIG. 4 $R_S$ and $R_P$ respectively show a series type element and a parallel type element. In FIG. 4(a) $R_S$ and $R_P$ are connected in series and given a voltage from the current E source. The potential at the middle point O between $R_S$ and $R_P$ varies according to the variation of $R_S$ and $R_P$. In case $\gamma$ of $R_P$ is larger than $1 (\gamma>1)$, $R_S$ is increased while the $R_P$ is decreased when the object image of each element becomes most distinct, so that the potential at O is rasied. Consequently the distinction on each element becomes maximum when the potential at D is maximum.

Figure 4A:
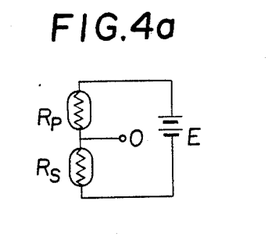
FIGS. 4A-4F shows the circuits of various disposition suited for the present invention, of the detecting members for the distinction of the object image.
Figure 4B:
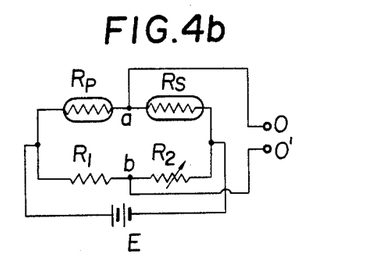
Figures 4C, 4D:
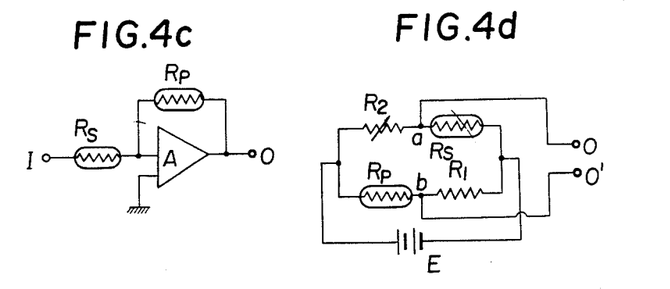

FIG. 4(b) shows a bridge circuit having $R_P$ and $R_S$ at the one side and the fixed resistance $R_1$ and the variable resistance $R_2$ at the other side, which bridge circuit is given a voltage from the current source E. In case $\gamma$ of $R_P$ is larger than $1(\gamma>1)$ $R_S$ is increased while $R_P$ is decreased when the distinction of the image on $R_S$ and $R_P$ is raised so that the potential at a is raised and therefore the voltage produced between O and O' becomes maximum when the distinction is maximum. In FIG. 4(d) $R_S$ and $R_P$ are connected to the calculating amplifier A as shown in the drawing, whereby the voltage $+E$ is given at point l. The potential at point O is proportional to the ratio of $R_S$ to $R_P$. In case $\gamma$ of $R_P$ is larger than $1$ $(\gamma>1)$ $R_S$ is increased while $R_P$ is decreased according as the distinction of the image on $R_S$ and $R_P$ is raised so that the ratio of the one to the other is varied considerably and therefore the potential at point O becomes either maximum or minimum when the distinction of the image becomes maximum. FIG. 4(d) shows the disposition of the detecting member in which $R_P$ for which $\gamma<1$ is used. $R_P$ and $R_S$ form two oblique sides and the fixed resistance $R_1$ and the variable resistance $R_2$ form other two oblique sides, whereby the bridge is given a voltage from the current source E.

Figure 4E:
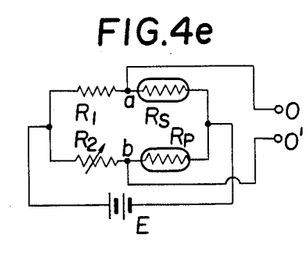

When the distinction of the image on $R_S$ and $R_P$ is increased the resistance of $R_S$ and that of $R_P$ are also increased and therefore the potential at point a is raised while the potential at point b is lowered so that the potential difference between O and O' is increased and becomes maximum when the distinction of the image is maximum. FIG. 4(e) shows an embodiment in which in one side of the bridge circuit $R_P$ for which $\gamma \div 1$ is used. In case of $R_P$ for which $\gamma \div 1$, the value of the resistance does not depend upon the distinction of the image but is varied only by the brightness of the object image, so that by means of the circuit shown in the drawing when the distinction of the object image is raised the potential at point a is also raised while the potential at point b remains unvaried, only assuming a value corresponding to the brightness of the object so that the potential difference between O and O' becomes maximum when the distinction of the object is maximum.

Figure 4F:
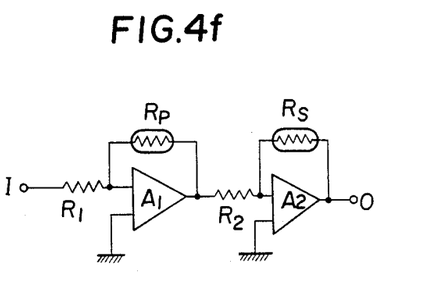

The advantage of the above embodiment lies in the fact that the variation of the level between O and O' due to the brightness can be checked. The embodiment of FIG. 4(f) is equal to that of FIG. 4(c) in its principle, whereby the calculating amplifiers $A_1$ and $A_2$ are cascade connected in such a manner that the potential at point O is varied corresponding to the ratio of the product $R_P \times R_S$ to the product $R_1 \times R_2$, whereby in ase $R_P$ for which $\gamma<1$ is used the potential proportional to the product $R_P \times R_S$ so that according as the distinction of the object image is raised the resistance value of $R_P$ and that of $R_S$ are increased and therefore the potential at point a assumes maximum value or minimum value when the distinction of the object image becomes maximum, although in case of the embodiment of FIG. 4(c) a considerable increase of the detecting sensibility of the distinction cannot be expected.

Figure 5:
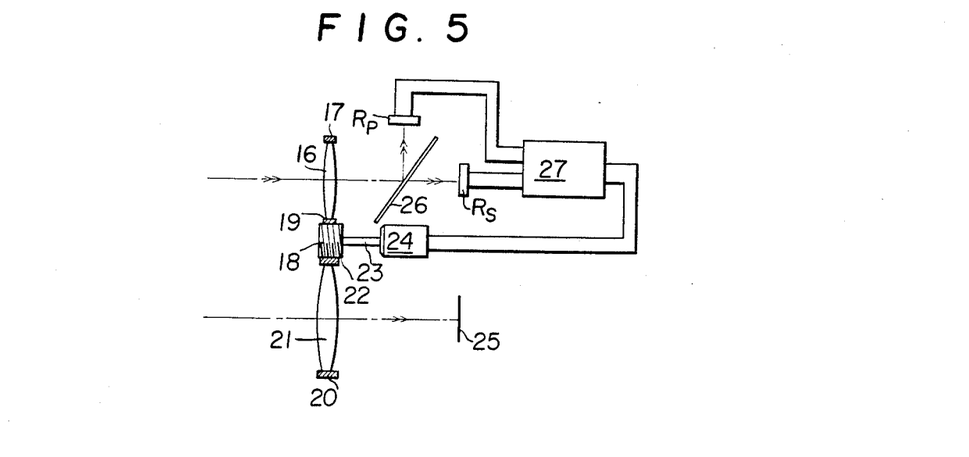
FIG. 5 shows a diagrammatical drawing of the automatic focus setting device especially suited for the camera and the like, in which the distinction detecting system according to the present invention is used.

FIG. 5 shows a concrete embodiment of the automatic focus setting device according to the present invention, in which one of the detecting members of the distinction of the object image in FIG. 4 is used, whereby 16 is an optics for detecting the distinction, being held by means of the lens barrel 17. On a lower part of the circumference of the lens barrel 17 a worm gear 18 engages with a rack 19 for moving the optics 16 forward and backward, being secured on the lens barrel 17. The worm 18 is engaged with the rack 22 provided on the upper part on the circumference of the lens barrel 20 so as to be rotated by the motor 24 by means of the shaft 23 in order that the photographing optics 21 held by the lens barrel 20 is moved forward and backward at the same time with the optics for detecting the distinction 16, so that by the forward and the backward rotation of the motor 24 the optics for detecting the distinction 16 and the photographing optics 21 is moved forward and backward at the same time. 25 is the film. Behind the optics for detecting the distinction 16 a semipermeable mirror 26 is provided in order to distribute the light beam to the series type element $R_S$ and to the parallel type element $R_P$ to form the image of the same object on those elements. The permeability of the semipermeable mirror 26 is desired to be so determined that such a ratio of distribution of the light beam as makes the resistance values of both elements almost equal when the object image is formed according to the difference between the resistance values of $R_S$ and $R_P$ for example in darkness can be obtained. $R_S$ and $R_P$ deliver the output to the control circuit 27, in which a control output corresponding to the distinction of the object image is delivered to the motor 24 which moves the optics for detecting the distinction 16 and the photographing optics 20 forward and backward respectively stops them in order to carry out the automatic focus setting by automatically setting the position of both optics at which the most distinct object image can be obtained. The operation of the present device will be explained in detail according to the drawing of an embodiment of the control circuit.

Figure 6:
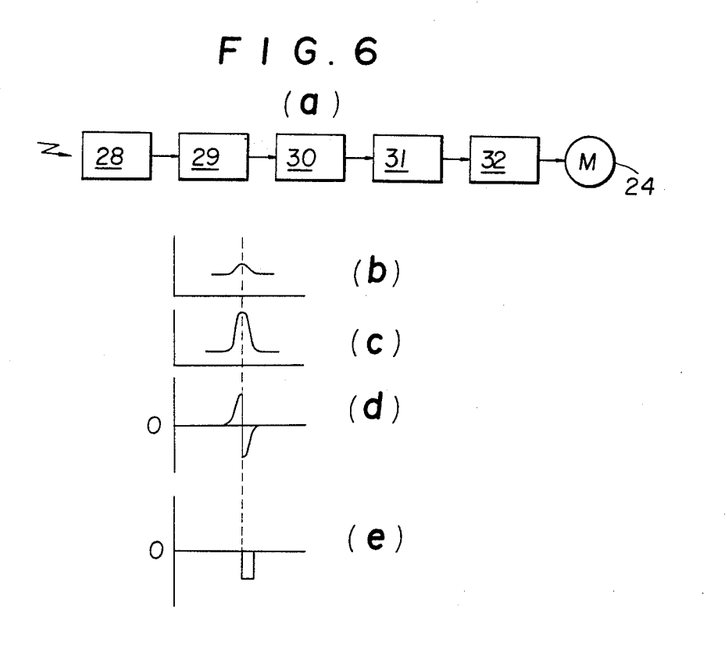
FIG. 6 shows an embodiment of the electric circuit applicable for the above device as well as diagrams for showing the variation of the output of each circuit member.

FIG. 6(a) shows an embodiment of the control circuit suited for the automatic focus setting device shown in FIG. 5, in block diagram. In the drawing 28 is a detecting circuit in which a proper embodiment of the circuit for detecting the distinction of the object image shown in FIG. 4 is used, whereby the output of the detecting circuit corresponds to the distinction of the object image as mentioned above, assuming a maximum value at the maximum distinction and a minimum value at the minimum distinction. The output is then delivered to the direct current amplifier 29 and amplified into a signal large enough for the next process. The output of the direct current amplifier 29 is delivered to the differentiating circuit 30 which delivered an output corresponding to the variation of the output of the direct current amplifier 29. The output of the differentiating circuit 30 is then delivered to the input of the comparator in which an abrupt variation of the differentiated output, namely the point at which the most distinct object image is obtained, is detected in such a manner that an impulse output is produced. Due to the impulse output the motor 24 is brought into a shortcircuited state by means of a switching circuit of the already known disposition in such a manner that the motor 24 is stopped instantly. The operation of the automatic focus setting device according to the present invention, shown in FIG. 5 and 6 is as follows.

The photographer directs the device to the object to be photographed and pushed down a not shown for example two step release button down to the first step, when the control circuit of FIG. 6(a) is brought into operation in such a manner that the motor 24 rotates according to a certain determined direction so as to move the photographing optics 21 and the optics for detecting the distinction 16 from the very near position or from the infinite position along a certain determined direction. The variation of the outputs of each block of the control circuit to the time is shown in FIGS. 6(b) - (e).

The output of the detecting circuit for the distinction 28 varies as shown in FIG. 6(b). At the most distinct point of the object image the output is raised abruptly and is lowered at both side. The variation of the output of the direct current amplifier 29 is as shown in FIG. 6(c), whereby it is merely the amplified variation of the output of FIG. 6(b). FIG. 6(d) shows the output of the differentiating circuit 30, whereby the sign is reversed at the most distinct point of the object image in such a manner that the output passes the zero potential in a very short time. In this embodiment the standard potential for comparison, of the comparator is set at zero in such a manner that an impulse is produced as soon as the differentiated output passes the zero potential. FIG. 6(e) shows this impulse. The impulse shown in FIG. 6(e) is delivered to the switching circuit 32 so that the motor 24 is instantly brought into the shortcircuited state and stopped. Thus the photographer learns that the object image is distinctly formed, by recognizing by a certain means that the optics is stopped, and then can expose the film by pushing down the release button down the second step.

It is natural that the present invention is not limited to the disposition of the above mentioned embodiments, whereby it is also possible to obtain a stable operation by providing the optics for detecting the distinction with a conventional diaphragm so as to make the illumination on the surface of the photoelectric element almost constant independent of the brightness of the object, or it is possible to stop the photographing lens at the over focus position by controlling the motor through detection of the output level of the direct current amplfer in case the above mentioned automatic focus setting operation is difficult for example when the brightness of the object is considerably low. Further it goes without saying that other embodiment of the control circuit presenting sufficient efficiency than the above mentioned can also be easily realized.

As mentioned above by adopting both series type element and parallel type element the device according to the present invention present a efficiency to carry out an automatic focus detection of the object of any pattern with high accuracy so that it is quite effective for the actual focus setting of the object which usually consists of complicated patterns.

What is claimed is:

1. A detecting device for detecting the image sharpness of an object, comprising;
   A. a movable image forming optical system;
   B. a photoelectric transducing means positioned behind the optical system to receive an image formed by the optical system, and having;
      a. a first elongated photoelectric transducing element having a semiconductor and electrodes deposited on both long sides of the semiconductor;
      b. a second elongated photoelectric transducing element having a semiconductor and electrodes deposited on both short sides of the semiconductor;
   C. electrical circuit means coupled to the elements for generating an electrical signal in response to the intensity distribution of the light on the phototransducing means, said first transducing means and second transducing means being connected to the circuit means to produce the electrical signal combining the output of the first transducing means with the output of the second transducing means,
   D. signal responding means coupled to said electrical circuit means in the path of light from the imaging forming optical system for detecting the image sharpness,
   E. said first transducing means and second transducing means being positioned in the path of light from the image forming optical system to receive light from the object.

2. The device according to claim 1, wherein said electrical circuit forms voltage dividing means with said first element and said second element, said elements being connected in series and responsive to the electrical signal, and output means connected to the connecting point between said elements.

3. The device according to claim 1, wherein said electrical circuit means forms a bridge circuit having a first branch with said first element connected therein, and a second branch with said second element connected therein.

4. The device according to claim 1, wherein said electrical circuit means forms an operational amplifier having one element connected as an input circuit and the other element as a feedback circuit.

5. The device according to claim 4, wherein said electrical circuit means forms two operational amplifiers with said elements, each of said amplifiers having one said elements connected in its feedback circuit.

6. A focusing device for focusing the image of an object in a focal plane comprising;
   A. optical means for forming the image on the focal plane,
   B. adjusting means for varying the distance between the optical means and the focal plane,
   C. photoelectric means arranged for receiving at least one portion of the object light image, the photoelectric means comprising:
      a. a first photoelectric transducing element having a first elongated semiconductor with two long sides, and electrodes deposited on both long sides of the semiconductor,
      b. a second photoelectric transducing element having a second elongated semiconductor with two long sides and two short sides and electrodes deposited on both short sides of the semiconductor, D. electrical circuit means coupled to the elements for generating an electrical signal in response to the intensity distribution of the light falling on the phototransducing means, said first transducing element and second transducing element being connected to the circuit means to produce the electrical signal combining the output of the first transducing element with the output of the second transducing element, E. means coupled to said electrical means and responsive to the electrical signal generated for driving and adjusting means so as to cause the light ray from the object to be focused into a sharp image on the photoelectric means.

7. The device according to claim 6, wherein the first photoeelectric element has a sinuous strip-like photoconductor means with two ends, output electrode means attached at the ends of the photoconductor means and an insulating material deposited in the space formed by said sinuous photoconductor means, the second photoelectric element having a second photoconductor means, contact electrode means attached on the photoconductor means in the substantially same form as said element and output electrode means which is connected to the contact electrode means.

8. The device according to claim 6, wherein the first photoelectric element has a base, a plurality of coaxial $\Omega$ shaped photoconductor means deposited on the base and connected in series, and an output electrode means deposited on the extremity of the photoconductor means, the second photoelectric element having a second base, a plurality of second photoconductor means deposited on the second base means, and a plurality of $\Omega$ shaped electrode means deposited on the second photoconductor means, said second photoconductor means being connected in series.

9. The device according to claim 8, wherein said first and second photoconductor means have the substantially same form.

10. A device as in claim 6, wherein said second semiconductor is in the shape of an elongated strip continuously folded upon itself in folds and insulated at the folds, said first semicondcutor is in the form of an elongated strip folded upon itself and conductively connected at the folds.

11. A device as in claim 6, wherein said first semiconductor is in the form of a semiconductor material covering an area, one of said electrodes including a plurality of conductive paths extending through the semiconductor material throughout the area and connected to each other, the other of said electrodes including a second plurality of interconnected conductive paths extending throughout the area, and interleaved with the first plurality of conductive paths, said first and second plurality of conductive paths being connected in said transducing element only through said semiconductor material, said second semiconductor including a semiconductor material covering a second area, said second semiconductor forming a plurality of insulating separations penetrating through the semiconductor material throughout the area so as to separate the semiconductor material conductively, said separations being continuous and extending into each other, said element including a second plurality of connected separations extending throughout the area and separating the semiconductor material conductively and interleaved between the first plurality of separations.

12. An apparatus as in claim 11, wherein said interleaved conductors in said first elements are branched, and wherein said separations in said second elements are branched.

13. An apparatus as in claim 6, wherein said first semiconductor forms a plurality of annular rings connected at predetermined locations but otherwise separated from each other and said electrodes extend between alternate ones of said rings along said ring, and wherein second semiconductor is in the shape of a plurality of annular rings connected at predetermined points to each other.

14. An apparatus as in claim 6, wherein said semiconductors each form a plurality of end connected elongated paths having given widths and separated along the elongated path from each other distances equal to or less than the widths, said electrodes in the first element extending between the paths where said paths are separated, said paths of said second elements being insulated from each other along the elongated lengths.

15. A device as in claim 6, wherein said optical means further comprises an optical arrangement having semitransparent means for reflecting and transmitting light and said first element and said second element are positioned for receiving the reflected and transmitted light respectively.

16. A device as in claim 6, wherein the value $v$ of the first and second photoconductor element is unequal to 1.

* * * * *

UNITED STATES PATENT OFFICE
CERTIFICATE OF CORRECTION

Patent No. 3,937,950               Dated February 10, 1976

Inventor(s)   KAZUYA HOSOE et al

It is certified that error appears in the above-identified patent and that said Letters Patent are hereby corrected as shown below:

Column 10, lines 20 and 21, "phototransducing" should read --transducing--; line 21, before "and", "means" should read --element--; line 22, "means" should read --element--; lines 27 and 28, "in the path of light from the imaging forming optical system" should read --and responsive to the electrical signal-- .  Column 11, line 6, "phototransducing" should read --photoelectric--; line 14, "and" should read --said--.

Signed and Sealed this twenty-ninth Day of June 1976

[SEAL]

Attest:

RUTH C. MASON
*Attesting Officer*

C. MARSHALL DANN
*Commissioner of Patents and Trademarks*